(12) United States Patent
Fukushima (10) Patent No.: US 8,120,869 B2
(45) Date of Patent: Feb. 21, 2012

(54) MAGNETIC RECORDING MEDIUM AND MAGNETIC RECORDING/REPRODUCING APPARATUS

(75) Inventor: Masato Fukushima, Ichihara (JP)

(73) Assignee: Showa Denko K.K., Tokyo (JP)

( * ) Notice: Subject to any disclaimer, the term of this patent is extended or adjusted under 35 U.S.C. 154(b) by 27 days.

(21) Appl. No.: 12/863,399

(22) PCT Filed: Jan. 16, 2009

(86) PCT No.: PCT/JP2009/050544
§ 371 (c)(1),
(2), (4) Date: Jul. 16, 2010

(87) PCT Pub. No.: WO2009/091030
PCT Pub. Date: Jul. 23, 2009

(65) Prior Publication Data
US 2011/0051281 A1   Mar. 3, 2011

(30) Foreign Application Priority Data
Jan. 17, 2008   (JP) .................................. 2008-007683

(51) Int. Cl.
*G11B 5/09* (2006.01)
*G11B 21/02* (2006.01)
(52) U.S. Cl. .......................................... 360/48
(58) Field of Classification Search .................. None
See application file for complete search history.

(56) References Cited

U.S. PATENT DOCUMENTS

| | | | |
|---|---|---|---|
| 5,828,536 A | 10/1998 | Morita | |
| 6,088,200 A | 7/2000 | Morita | |
| 6,841,224 B2 | 1/2005 | Kamata et al. | |
| 7,067,207 B2 | 6/2006 | Kamata et al. | |
| 7,147,790 B2 | 12/2006 | Wachenschwanz et al. | |
| 7,166,261 B2 | 1/2007 | Kamata et al. | |
| 7,232,621 B2 | 6/2007 | Kamata et al. | |
| 7,549,209 B2 | 6/2009 | Wachenschwanz et al. | |
| 2002/0142192 A1 | 10/2002 | Kamata et al. | |
| 2004/0091748 A1 | 5/2004 | Kamata et al. | |
| 2004/0101713 A1 | 5/2004 | Wachenschwanz et al. | |
| 2004/0191557 A1 | 9/2004 | Kamata et al. | |
| 2004/0258833 A1 | 12/2004 | Kamata et al. | |
| 2005/0120545 A1 | 6/2005 | Wachenschwanz et al. | |
| 2005/0214583 A1 | 9/2005 | Ito et al. | |
| 2006/0132953 A1 | 6/2006 | Asakura et al. | |

FOREIGN PATENT DOCUMENTS

| | | |
|---|---|---|
| JP | 05-205257 A | 8/1993 |
| JP | 09-204649 A | 8/1997 |
| JP | 09-204652 A | 8/1997 |

(Continued)

*Primary Examiner* — Daniell L Negron
*Assistant Examiner* — Regina N Holder
(74) *Attorney, Agent, or Firm* — Sughrue Mion, PLLC (57) ABSTRACT

A magnetic recording medium having a magnetic pattern magnetically partitioning a magnetic layer, formed on a non-magnetic substrate, wherein the magnetic pattern is comprised of magnetic regions and non-magnetic regions surrounding each of the magnetic regions, the non-magnetic regions form depressions, the magnetic pattern comprises data areas and servo information areas, and the difference between the areal ratio of the depressions in the data areas and the areal ratio thereof in the servo information areas is within ±10%. The magnetic areas preferably comprise a magnetic layer having a granular structure comprised of magnetic grains each surrounded by an oxide, or a two-layer structure comprising the granular structure and a non-granular structure formed on the granular structure. The magnetic recording medium exhibits stable head-floating characteristics, and thus, the largest floating height can be reduced, and a high recording density can be obtained.

7 Claims, 6 Drawing Sheets

FOREIGN PATENT DOCUMENTS

| | | |
|---|---|---|
| JP | 11-161944 A | 6/1999 |
| JP | 2002-359138 A | 12/2002 |
| JP | 2004-164692 A | 6/2004 |
| JP | 2004-178793 A | 6/2004 |
| JP | 2004-178794 A | 6/2004 |
| JP | 2005-276275 A | 10/2005 |
| JP | 2006-031849 A | 2/2006 |
| JP | 2006-048751 A | 2/2006 |
| JP | 2006-179128 A | 7/2006 |

Step A

Step B

Step C

Step D

Step E

MAGNETIC RECORDING MEDIUM AND MAGNETIC RECORDING/REPRODUCING APPARATUS

TECHNICAL FIELD

This invention relates to a magnetic recording medium used for a magnetic recording/reproducing apparatus such as a hard disk apparatus. It further relates to a magnetic recording/reproducing apparatus.

BACKGROUND ART

In recent years, magnetic recording apparatuses such as a magnetic disk apparatus, a flexible disk apparatus and a magnetic tape apparatus are widely used with their importance being increasing. Recording density of a magnetic recording medium used in the magnetic recording apparatus is greatly enhanced. Especially, since the development of MR head and PRML technique, the areal recording density is more and more increasing. Recently GMR head and TMR head have been developed, and the rate of increase in the areal recording density is about 100% per year. There is still increasing a demand for further enhancing the recording density, and therefore, a magnetic layer having a higher coercive force, and a higher signal-to-noise ratio (SNR) and a high resolution are eagerly desired.

An attempt of increasing the track density together with an increase of a liner recording density to enhance an areal recording density is also being made.

In a recent magnetic recording apparatus, the track density has reached about 110 kTPI. However, with an increase of the track density, magnetic recording information is liable to interfering with each other between adjacent tracks, and magnetization transition regions in the boundary regions thereof as a noise source tend to impair the SNR. These problems result in lowering in bit error rate and impede the enhancement of the recording density.

To enhance the areal recording density, it is required to render small the size of each recording bit and give the maximum saturated magnetization and magnetic film thickness to each recording bit. However, with a decrease in the bit size, the minimum magnetization volume per bit becomes small, and the recorded data are tend to disappear due to magnetization reversal caused by heat fluctuation.

Further, in view of the reduction in distance between the adjacent tracks, a high-precision track servo system technology is required for the magnetic recording apparatus, and an operation is generally adopted wherein recording is carried out widely but the reproduction is carried out narrowly so that the influence of the adjacent tracks is minimized. This operation is advantageous in that the influence of the adjacent tracks can be minimized, but it is disadvantageous in that the reproduction output is rather low. This also leads to difficulty in enhancement of the SNR to a desired high level.

To reduce the heat fluctuation, maintain the desired SNR and obtain the desired reproduction output, a proposal has been made wherein elevations and depressions are formed, which extend along the tracks on a surface of a magnetic recording medium, so that each of patterned tracks on the elevations is partitioned by the depressions whereby the track density is enhanced. This type of magnetic recording media is hereinafter referred to as a discrete track media, and the technique for providing this type of magnetic recording media is hereinafter referred to as a discrete track method.

An example of the discrete track medium is a magnetic recording medium disclosed in, for example, patent document 1, which is made by providing a non-magnetic substrate having a pattern with elevations and depressions formed on the surface thereof, and forming a magnetic layer having a corresponding surface configuration on the non-magnetic substrate, to give physically discrete magnetic recording tracks and servo signal patterns (see, for example, patent document 1).

The above-mentioned magnetic recording medium has a multilayer structure such that a ferromagnetic layer is formed via a soft magnetic underlayer on the non-magnetic substrate having the pattern with elevations and depressions, which are formed on the surface thereof, and an overcoat is formed on the ferromagnetic layer. The magnetic recording patterned regions form magnetic recording regions on the elevations physically partitioned from the surrounding regions.

In the above-mentioned magnetic recording medium, the occurrence of ferromagnetic domain wall in the soft magnetic underlayer can be prevented or minimized and therefore the influence due to the heat fluctuation is reduced and the interfere between the adjacent signals is minimized with the result of provision of a magnetic recording medium with high recording density exhibiting a large SNR.

The discrete track method includes two type of methods: a first type method wherein tracks are formed after the formation of a multilayer magnetic recording medium comprising several laminated films; and a second type method wherein patterns having elevations and depressions are formed directly on a substrate or formed on a film layer for forming tracks thereon, and then a multilayer magnetic recording medium is formed using the patterned substrate or the patterned film layer (see, for example, patent document 2 and patent document 3). The first type method is often called a magnetic layers-treating type method, and the second type method is often called as an embossing type method.

Another discrete track method has been proposed wherein a previously formed magnetic layer is, for example, subjected to an implantation of nitrogen ion or oxygen ion or irradiated with laser whereby regions partitioning magnetic tracks in a discrete track medium are formed. (see, for example, patent document 4).

Further, a method of producing a magnetic recording medium has been proposed, which comprises a step of subjecting a magnetic layer to an ion milling using a carbon mask (see patent document 5).

Further, another method for forming a magnetic pattern has been proposed in patent document 6, which comprises a step of forming a ferromagnetic layer comprising at least one element selected from Fe, Co and Ni, a step of selectively masking the surface of the ferromagnetic layer, a step of exposing the regions of the surface of ferromagnetic layer, which have been exposed by the selective masking, to a halogen-containing reactive gas whereby the ferromagnetic layer and an under layer are chemically reacted with an active ingredient in the reactive gas in said exposed regions of ferromagnetic layer to be thereby rendered non-ferromagnetic regions.

Patent document 7 teaches that variation in an areal ratio of the magnetic pattern to the non-magnetic regions along the radius directions in the magnetic disk enables to suppress or minimize the reproduction errors.

Patent document 1 JP 2004-164692 A1
Patent document 2 JP 2004-178793 A1
Patent document 3 JP 2004-178794 A1
Patent document 4 JP H5-205257 A1
Patent document 5 JP 2006-31849 A1
Patent document 6 JP 2002-359138 A1
Patent document 7 JP 2006-48751 A1

DISCLOSURE OF THE INVENTION

Problems to Be Solved by the Invention

For the manufacture of a discrete type or bit pattern type magnetic recording medium, a process is generally adopted wherein a magnetic layer having elevations and depressions on the surface thereof is formed, and a non-magnetic material is filled in the depressions to render the surface flat and smooth. Another process can be adopted wherein a mask layer having a pattern corresponding to a magnetic pattern is formed on a magnetic layer, specific portions of the magnetic layer are demagnetized or magnetic properties of said portions are modified by, for example, ion implantation to form a magnetic pattern on the magnetic layer. According to the latter process, the resulting magnetic recording medium having the magnetic recording pattern has a flat and smooth surface even though a procedure of filling depressions with a non-magnetic material is not adopted.

With regard to the above-mentioned process of forming a mask layer having a pattern corresponding to a magnetic pattern on a magnetic layer, and demagnetizing or modifying the magnetic properties of the specific portions of the magnetic layer to form a magnetic pattern on the magnetic layer, the present inventor has developed a process comprising a step of forming a mask layer having a pattern corresponding to a magnetic pattern on a magnetic layer, and a step of reacting the exposed surface of magnetic layer with, for example, an oxygen gas thereby demagnetizing or modifying the magnetic properties of the specific portions of the magnetic layer. It has been revealed in this process that the reactivity of the magnetic layer with an oxygen gas is enhanced by removing a surface layer portion of the exposed surface of magnetic layer prior to the reaction. The magnetic recording medium produced by this process has a surface which is uneven to a slight extent, therefore, it is preferable to fill depressions on the uneven surface with a non-magnetic material to render the surface even and smooth.

However, the surface-smoothing procedure of filling the surface depressions with a non-magnetic material tends to contaminate the surface of the magnetic recording medium, and makes the production process complex and costly.

A primary object of the present invention is to provide a discrete type or bit pattern type magnetic recording medium, which exhibits, even though depressions remain on the surface thereof, stable head-floating characteristics and excellent separability of the magnetic pattern, and which is not influenced by a signal interference between the adjacent patterns, and exhibits a high recording density.

Means for Solving the Problems

To solve the above-mentioned problems, the present inventor made extensive researches and has completed the present invention.

Thus, in accordance with the present invention, there are provided the following magnetic recording mediums (1) through (6), and the following magnetic recording/reproducing apparatus (7).

(1) A magnetic recording medium having a magnetic pattern magnetically partitioning a magnetic layer, formed on at least one surface of a non-magnetic substrate, characterized in that the magnetic pattern is comprised of magnetic regions and non-magnetic regions surrounding each of the magnetic regions, wherein the non-magnetic regions form depressions relative to the magnetic pattern, the magnetic pattern comprises data areas and servo information areas, and an absolute value of the difference between the areal ratio of the depressions in the data areas and the areal ratio of the depressions in the servo information areas is not larger than 10%.

(2) The magnetic recording medium as described above in (1), wherein the areal ratio of the depressions in the data areas is in the range of 10% to 50%.

(3) The magnetic recording medium as described above in (1) or (2), wherein the data areas form elevations constituting tracks in the data areas.

(4) The magnetic recording medium as described above in any one of (1) to (3), wherein the depressions in the data areas and the depressions in the servo information areas have a depth in the range of 0.1 nm to 15 nm.

(5) The magnetic recording medium as described above in any one of (1) to (4), wherein the magnetic regions comprise a magnetic layer having a granular structure comprised of magnetic grains each surrounded by an oxide.

(6) The magnetic recording medium as described above in any one of (1) to (5), wherein the magnetic regions comprise a magnetic layer having a two-layer structure composed of a granular structure comprised of magnetic grains each surrounded by an oxide, and a non-granular structure, formed on the granular structure.

(7) A magnetic recording/reproducing apparatus characterized by comprising, in combination, the magnetic recording medium as described above in any one of (1) t (6); a driving part for driving the magnetic recording medium in the recording direction; a magnetic head comprising a recording part and a reproducing part; means for moving the magnetic head in a relative motion to the magnetic recording medium; and a recording-and-reproducing signal treating means for inputting signal to the magnetic head and for reproducing output signal from the magnetic head.

EFFECT OF THE INVENTION

In the discrete type orbit pattern type magnetic recording medium of the present invention, even though depressions remain on the surface of the magnetic recording medium, stable head-floating characteristics can be attained. Therefore, the magnetic recording medium of the present invention exhibits excellent separability of the magnetic pattern, and is not influenced by a signal interference between the adjacent patterns, and exhibits a high recording density.

Figure 1:
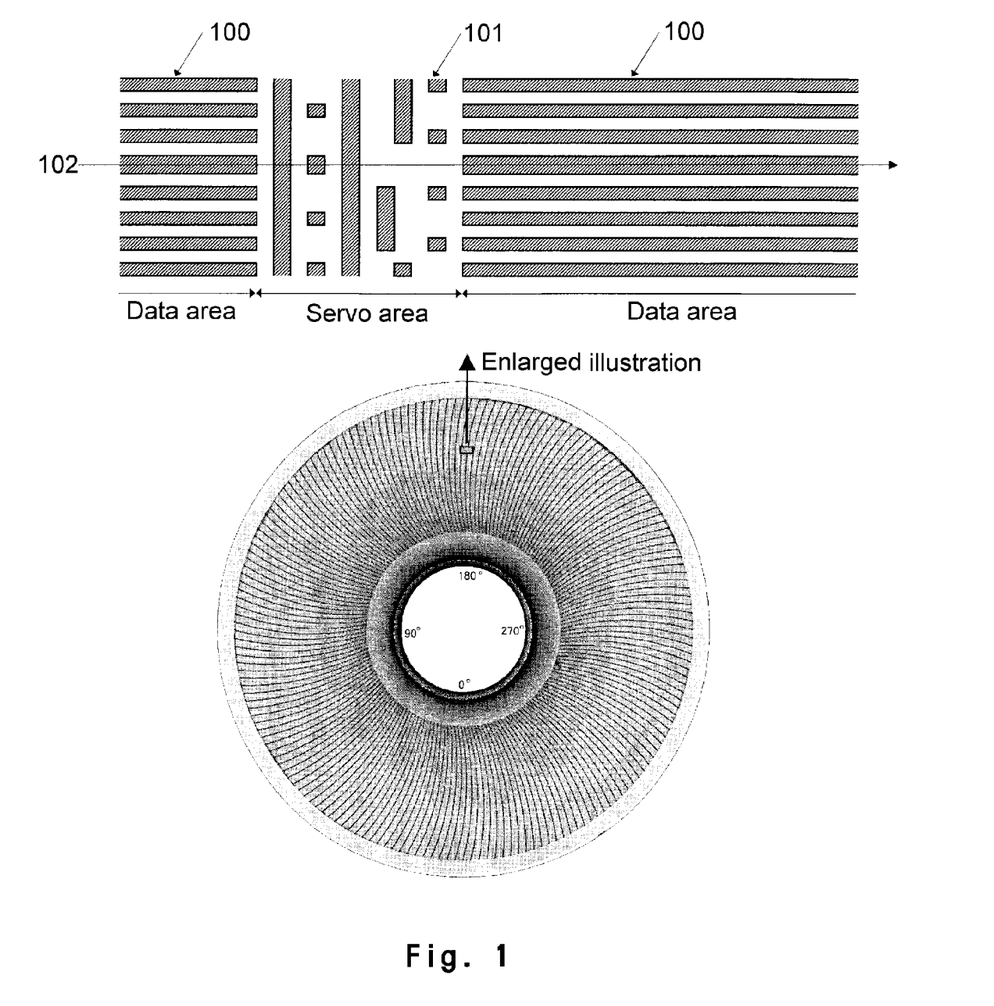
FIG. 1 illustrates patterns of a servo information area and data areas of the magnetic recording medium according to the present invention.
Figure 2:
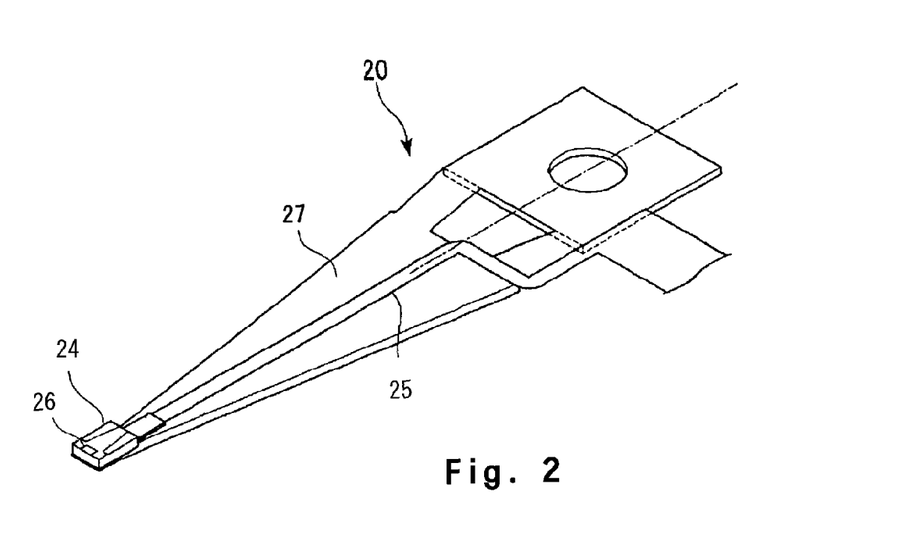
FIG. 2 is a perspective view of a head gimbals assembly used in a magnetic recording/reproducing apparatus.
Figure 3:
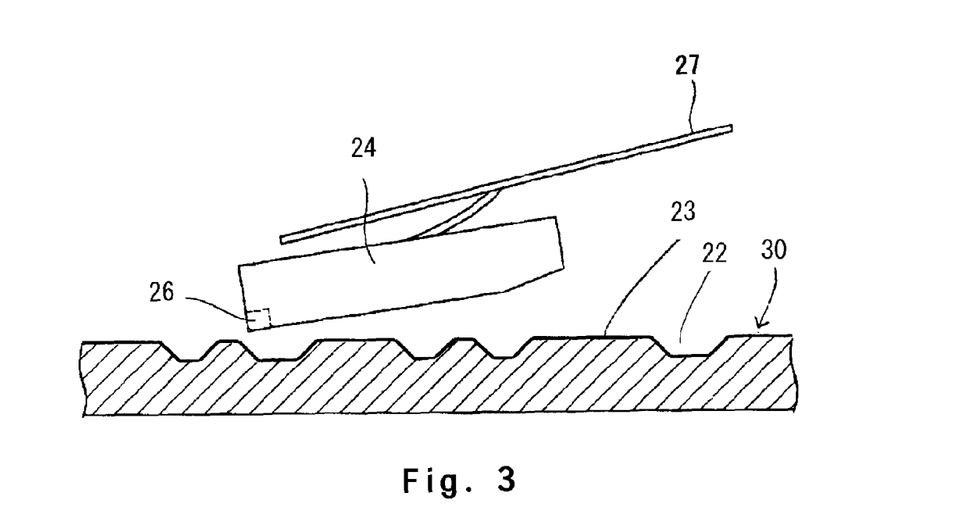
FIG. 3 is a sectional view illustrating a floating state of a head slider above the magnetic recording medium.
Figure 4:
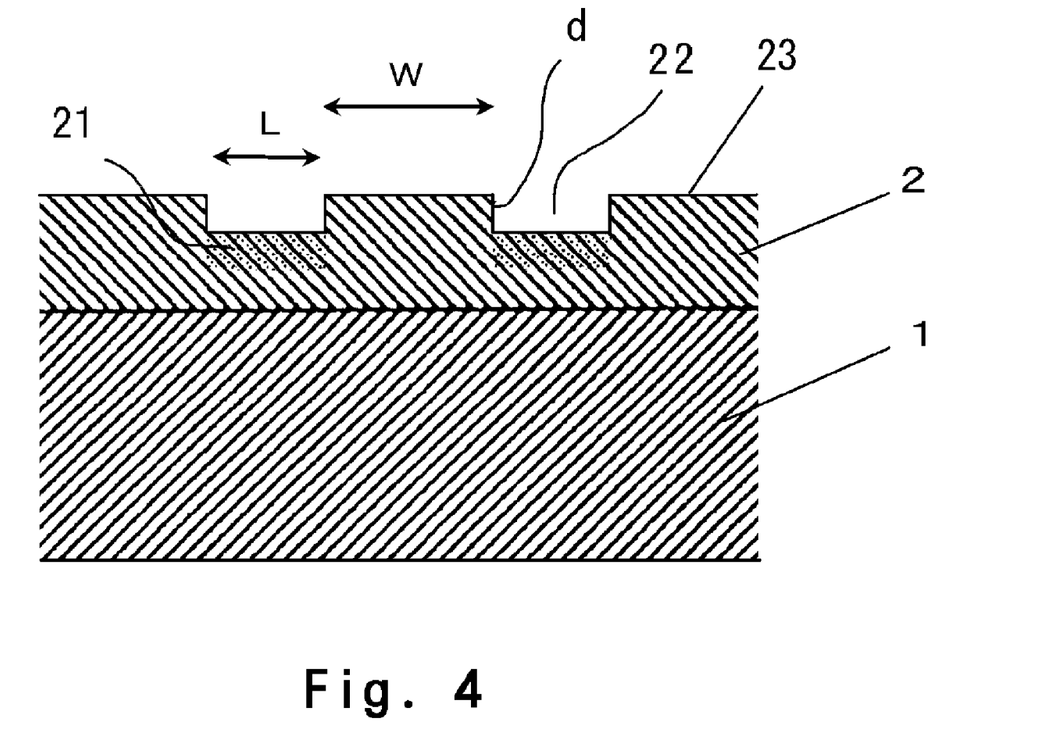
FIG. 4 is a cross-section of one example of a laminate structure comprising a substrate and a magnetic layer in the magnetic recording medium according to the present invention.
Figure 5:
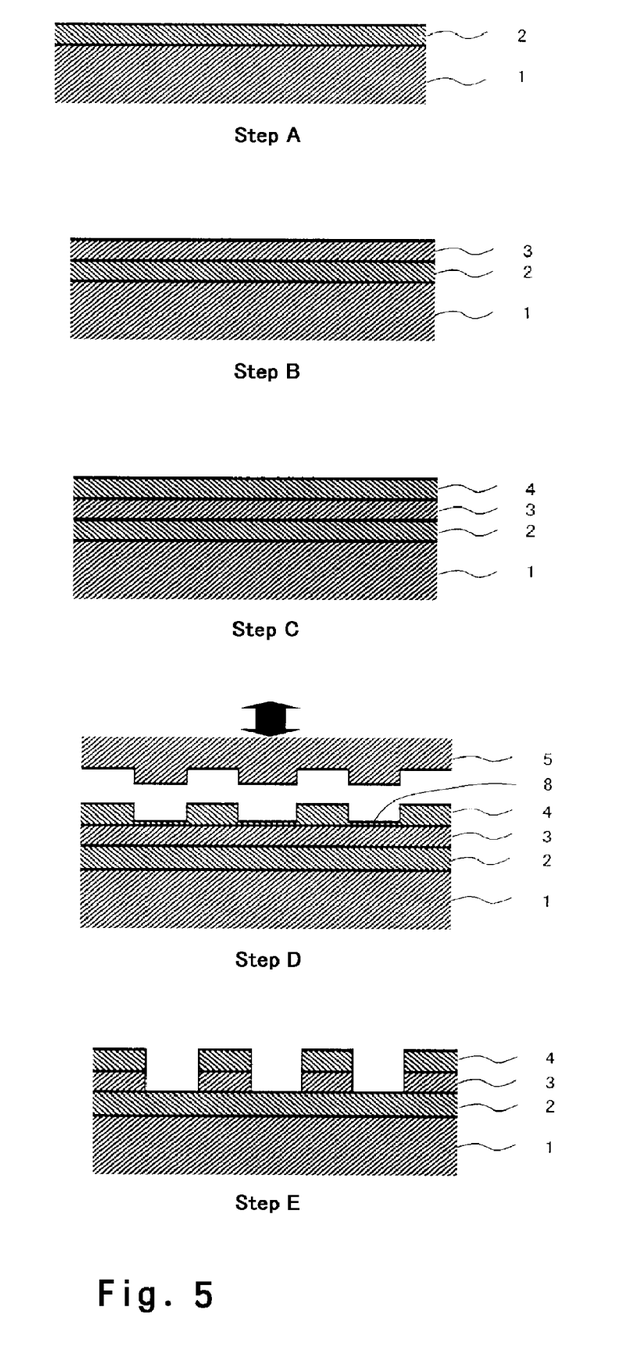
FIG. 5 is a flow-sheet of the first-half steps in a process for producing a magnetic recording medium according to the present invention.
Figure 6:
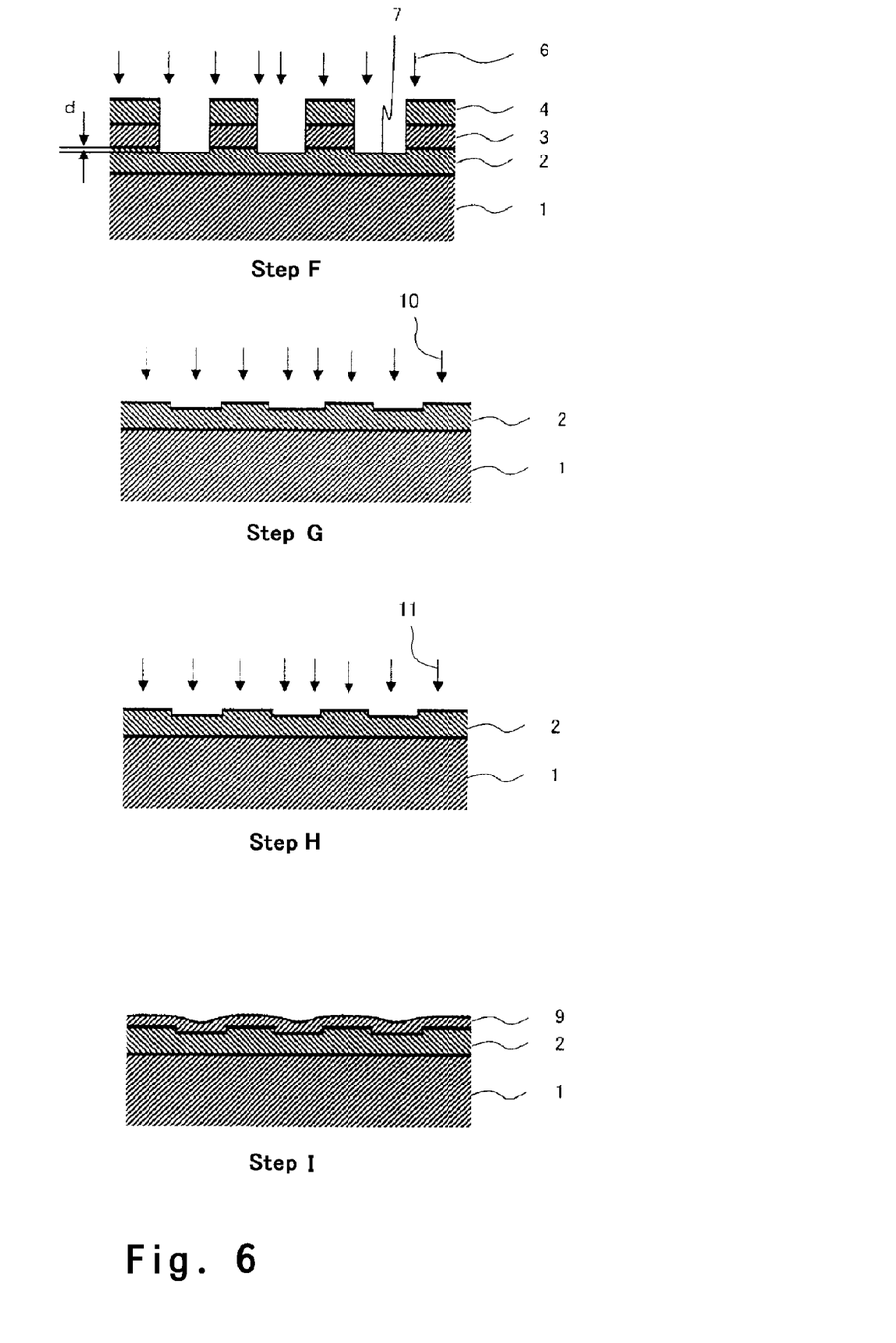
FIG. 6 is a flow-sheet of the second-half steps in a process for producing a magnetic recording medium according to the present invention.
Figure 7:
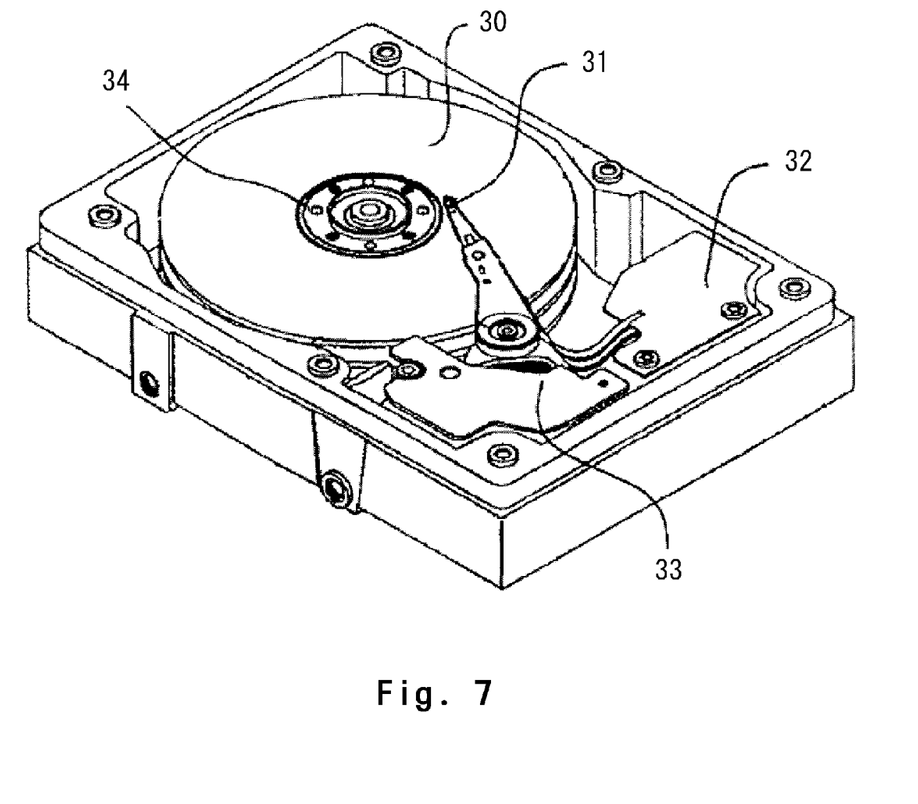
FIG. 7 is a schematic illustration of the magnetic recording-reproducing apparatus according to the present invention.

| | Reference numerals: |
|---|---|
| | In FIG. 1, |
| 100 | Data area |
| 101 | Servo information area |
| 102 | Direction in which a head moves |
| | In FIG. 2 and FIG. 3, |
| 20 | Head gimbals assembly |
| 22 | Depression |
| 23 | Elevation |
| 24 | Head slider |
| 25 | Signal line |
| 26 | Magnetic head |
| 27 | Suspension arm |
| 30 | Magnetic recording medium |
| | In FIG. 4, |
| 1 | Non-magnetic substrate |
| 2 | Magnetic layer |
| 21 | Magnetic properties-modified region or demagnetized region |
| 22 | Depression |
| 23 | Elevation |
| W | Width of magnetic region in magnetic recording pattern |
| L | Width of non-magnetic region in magnetic recording pattern |
| d | Depth of region from which surface layer portion of magnetic layer has been partially removed, i.e., thickness of removed surface layer portion of magnetic layer |
| | In FIG. 5 and FIG. 6, |
| 1 | Non-magnetic substrate |
| 2 | Magnetic layer |
| 3 | Carbon mask layer |
| 4 | Resist layer |
| 5 | Stamp |
| 6 | Milling ion |
| 7 | Region from which surface layer portion of magnetic layer have been partially removed |
| d | Depth in region from which surface layer portion of magnetic layer has been partially removed, i.e., thickness of removed surface layer portion of magnetic layer. |
| 8 | Depression in resist layer, formed by pressing |
| 9 | Protective overcoat |
| 10 | Oxygen, ozone or others |
| 11 | Inert gas such as argon |
| | In FIG. 7, |
| 30 | Magnetic recording medium |
| 31 | Magnetic head |
| 32 | Recording-reproducing signal system |
| 33 | Head-driving part |
| 34 | Medium-driving part |

BEST MODE FOR CARRYING OUT THE INVENTION

The present invention is concerned with a magnetic recording medium having a magnetically partitioned magnetic pattern. The magnetic pattern is comprised of magnetic regions and non-magnetic regions, wherein the magnetic regions form elevations and the non-magnetic regions form depressions relative to the magnetic pattern. The elevations are partitioned by the depressions, and the elevations and the depressions occur at least on the surface layer portion of a magnetic layer.

The magnetic recording medium of the present invention can be either a discrete type magnetic recording medium or a bit pattern type magnetic recording medium. However, the present invention will be described in detail and specifically in reference to a discrete type magnetic recording medium.

In FIG. 1, servo information pattern 101 in a servo information area (which is abbreviated to "servo area" when appropriate) and data patterns 100 in data areas are illustrated. The lower part of FIG. 1 is a schematic elevation of the magnetic recording medium according to the present invention, and the upper part thereof is an enlarged detailed illustration of apart of the magnetic recording medium. The radial lines in the lower part indicate servo areas and areas intervening the radial lines indicate data areas. An arrow 102 in FIG. 1 indicates a position and a direction in which a head moves on the surface of magnetic recording medium.

A multiplicity of data recording areas (which are abbreviated to "data areas" when appropriate) are present on the surface of the magnetic recording medium, and these data areas are positioned by track information and sector information. The magnetic head scans the surface of the magnetic recording medium to read track information and sector information in a data area corresponding to a servo information area, then synchronize reading-and-writing of data in a burst pattern area, and then, read-and-write an information in a data area. In the servo information area, a track information and a sector information are recorded as digital information in accordance with magnetic patterns as shown in FIG. 1. In the data areas, magnetic patterns partitioned by tracks are formed. The magnetic patterns are defined by non-magnetic regions surrounding each magnetic pattern.

In the magnetic recording medium according to the present invention, the non-magnetic regions defining magnetic patterns form depressions. In general, if depressions are present on the surface of magnetic recording medium, the floating of a magnetic head over the surface thereof is unstable. Especially a servo information area has an uneven surface where elevations and depressions are irregularly present, but a data area have regular elevations and depressions. Thus, when the magnetic head moves from a servo information area to a data area, or form a data area to a servo information area, the floating of the head tend to fluctuate. For example, if the magnetic layer has a large areal ratio of elevations, the magnetic head gets wind and floats to a large extent.

FIG. 2 is a perspective view of a head gimbals assembly provided with a magnetic head. A head gimbals assembly 20 has a suspension arm 27 made of a metal sheet, a head slider 24 fitted to a top portion of the suspension arm 27, a magnetic head 26 fitted on the head slider 24, and a control means (not shown) electrically connected by a signal line 25.

The magnetic head 26 is fitted to a trading side of the magnetic head, which is opposite to a reading side forming a slope of the head slider 24, and is located in the immediate vicinity of a magnetic recording medium 30. As the magnetic head 26, heads suitable for a high recording density are preferably used, which are provided with a reproduction element such as a magnetoresistance (MR) element utilizing a giant magneto resistive (GMR) effect or a tunnel-type magneto resistive (TMR) element utilizing a TMR effect. The TMR element is especially preferable in view of very enhanced high-density recording.

The magnetic head 26 moves while it floats immediately above the elevations and depressions remaining on the surface of the magnetic recording medium 30 as illustrated in FIG. 3. The size of the head slider 24 is a square of about 0.5 to 2 mm. The head slider 24 travels with an inclination above the surface of magnetic recording medium as illustrated in FIG. 3. Therefore, an uneven surface of the magnetic recording medium exerts an adverse influence not upon the whole confronting surface of the head slider, but upon only a limited area of the confronting surface thereof. The present inventor has found that the elevations and the depressions remaining on the surface of magnetic recording medium have an adverse influence upon only a narrow area with a square of about 500 μm of the confronting surface of head slider.

Thus, the main feature of the present invention lies in that, for the area of about 500 μm square of the confronting surface of head slider, an absolute value of the difference between the areal ratio of the depressions in the data areas and the areal ratio of the depressions in the servo information areas is not larger than 10%. By this feature regarding to the areal ratio of the depressions, stability of floating characteristics of the magnetic head floating above the surface of magnetic recording medium can be ensured.

The patterns of a servo information area and data areas of a magnetic recording medium, as exemplified in FIG. 1, have several tens nm of track pitches or several hundreds nm of track pitches. Therefore the size of the patterns formed on the magnetic recording medium is sufficiently small as compared with the size of about 500 μm square of the confronting surface of head slider. The areal ratios of depressions in the patterns can be appropriately expressed by an average value obtained on the basis of the size of the head slider.

Therefore, the above-mentioned main feature of the present invention "for the area of about 500 μm square of the confronting surface of head slider, an absolute value of the difference between the areal ratio of the depressions in the data areas and the areal ratio of the depressions in the servo information areas is not larger than 10%" can be said as having substantially the same meaning as "for the surface of the magnetic recording medium, an absolute value of the difference between the areal ratio of the depressions in the data areas and the areal ratio of the depressions in the servo information areas is not larger than 10%".

In other words, the present invention is defined as a magnetic recording medium having a magnetic pattern magnetically partitioning a magnetic layer, formed on at least one surface of a non-magnetic substrate, characterized in that the magnetic pattern is comprised of magnetic regions and non-magnetic regions surrounding each of the magnetic regions, wherein the non-magnetic regions form depressions relative to the magnetic pattern, the magnetic pattern comprises data areas and servo information areas, and an absolute value of the difference between the areal ratio of the depressions in the data areas and the areal ratio of the depressions in the servo information areas is not larger than 10%. More specifically, in the case when the areal ratio of the depressions in the data areas is, for example, 15% (i.e., the areal ratio of the elevations in the data areas is 85%), the areal ratio of the depressions in the servo information areas is in the range of 13.5% to 16.5% in the present invention.

In the case when the areal ratio of the depressions in the data areas and the areal ratio of the depressions in the servo information areas satisfy the above requirements, when the magnetic head moves from the servo information area to the data area, or from the data area to the servo information area, the floating of the head is not rendered unstable, and, stable electromagnetic conversion characteristics of the magnetic recording medium can be ensured.

The areal ratio of the depressions in the data areas in the magnetic recording medium of the present invention is preferably in the range of 10% to 50%. When the areal ratio of depressions in the data area is within this range, and the areal ratio of the depressions in the servo information area is in a range such that an absolute value of the difference between the two areal ratios is not larger than 10%, the floating of the magnetic head above the surface of magnetic recording medium is stable and excellent electromagnetic conversion characteristics can be obtained. If the areal ratio of the depressions in the data areas is smaller than 10%, a stable floating of the magnetic head can be ensured, but the partitioning between the adjacent tracks in the data area tends to become poor. In contrast, if the areal ratio of the depressions in the data areas is larger than 50%, a stable floating of the magnetic head is often difficult to obtain because a whirl of air tends to occur in the depressions.

The magnetic recording medium of the present invention is preferably of a discrete type, that is, it is preferable that the elevations in the data areas form tracks.

In the magnetic recording medium of the present invention, the depressions in the data areas and those in the servo information areas preferably have a depth in the range of 0.1 nm to 15 nm. If the depth of the depressions is smaller than 0.1 nm, the beneficial effects of the invention are often difficult to attain. In contrast, if the depth of the depressions is larger than 15 nm, a stream of air occurring between the surface of magnetic recording medium and the magnetic head often becomes unstable and the floating characteristics of the magnetic head are liable to be deteriorated.

A process for producing the magnetic recording medium according to the present invention will be described in detail. The following description is concerned with the production of a discrete type magnetic recording medium, but, a bit pattern type magnetic recording medium can also be produced by a similar process.

A typical example of the magnetic recording medium of the present invention has a structure comprising a non-magnetic substrate, a soft-magnetic underlayer and an intermediate layer, a magnetic layer having magnetic regions with a magnetic pattern and non-magnetic regions, and a protective overcoat, which are formed in this order on the non-magnetic substrate. The magnetic regions with a magnetic pattern are partitioned by the non-magnetic regions.

In FIG. 4, one example of a laminate structure comprising only a substrate and a magnetic layer in the magnetic recording medium according to the present invention is illustrated. A magnetic layer 2 is formed on a non-magnetic substrate 1. The magnetic layer 2 has depressions 22 formed in specific regions by removing surface layer portions of the magnetic layer 2. d is a depth of the depressions 22. Magnetically modified region or demagnetized region 21 is formed beneath each depression 22. The magnetic layer 2 is partitioned by the depressions 22 and the magnetic properties-modified regions or demagnetized regions 21, thereby forming thus-partitioned elevations 23. The regions 21 may be either demagnetized regions or regions having modified magnetic properties.

The process for producing the magnetic recording medium according to the present invention which has the laminate structure as specifically exemplified in FIG. 4 will be described with reference to FIG. 5 and FIG. 6 which illustrate flow-sheets of the first-half steps and the second-half steps, respectively, in the production process. The production process comprises the following steps A through G and optional steps H and I.

As illustrated in FIG. 5,

Step A of forming at least a magnetic layer 2 on a non-magnetic substrate 1.

Step B of forming a carbon mask layer 3 on the magnetic layer 2.

Step C of forming a resist layer 4 on the carbon mask layer 3.

Step D of transferring a negative magnetic recording pattern onto the resist layer 4 by pressing a stamp 5 against the resist layer 4. The negative magnetic recording pattern refers to a negative pattern having depressions formed on the resist layer, which depressions have been formed in the regions for separating recording tracks formed on the magnetic layer.

The arrow in step D in FIG. 5 refers to the direction in which the stamp 5 moves. Reference numeral 8 represents a depression in the resist layer 8, which is formed by pressing.

Step E of selectively removing the residual portions of the mask layer 3 and the residual portions of the resist layer 4, which portions form depressions corresponding to the negative pattern of the magnetic recording pattern as illustrated in step D.

As illustrated in FIG. 6,

Step F of exposing to milling ion 6 the exposed depressions of the surface layer of magnetic layer 2, corresponding to the regions from which the resist layer 4 and the mask layer 3 have been removed, thereby removing the surface layer portions in the ion-milled regions of magnetic layer. Reference numeral 7 indicates the ion-milled regions of the surface layer of magnetic layer, and reference letter d indicates the thickness of the surface layer portions of magnetic layer which have been removed by ion-milling.

Step of exposing the ion-milled regions 7 of the magnetic layer, from which the surface layer portions of magnetic layer have been removed, to oxygen or ozone 10, or irradiating said ion-milled regions 7 of the magnetic layer with a laser, or exposing said ion-milled regions 7 of the magnetic layer to a reactive plasma or a reactive ion 10, thereby modifying the magnetic properties of the regions 7 of magnetic layer or demagnetizing said regions 7 of magnetic layer. This step of magnetic properties-modification or demagnetization is optional but preferable.

Step G of removing the residual resist layer 4 and the residual mask layer 3.

The production process further comprises preferably an optional step of, prior to the step G for magnetic properties-modification or demagnetization of the ion-milled regions 7 of the magnetic layer, exposing said ion-milled regions 7 of the magnetic layer to a fluorine-containing gas.

The production process comprises preferably an optional step H of, after the step G, irradiating the exposed surface of the magnetic layer 2 with an inert gas 11 such as argon to remove a surface layer portion of the magnetic layer 2; and further comprises preferably an optional step I of forming a protective overcoat 9 on the magnetic layer 2.

The non-magnetic substrate 1 used in the present invention is not particularly limited, and, as specific examples thereof, there can be mentioned aluminum alloy substrates predominantly comprised of aluminum such as, for example, an Al—Mg alloy substrate; and substrates made of ordinary soda glass, aluminosilicate glass, glass ceramics, silicon, titanium, ceramics, and organic resins. Of these, aluminum alloy substrates, glass substrates such as glass ceramics substrate, and silicon substrate are preferably used.

The non-magnetic substrate preferably has an average surface roughness (Ra) of not larger than 1 nm, more preferably not larger than 0.5 nm, and especially preferably not larger than 0.1 nm.

The magnetic layer 2, formed on a surface of the above-mentioned non-magnetic substrate 1, may be either an in-plane magnetic layer or a perpendicular magnetic layer. A perpendicular magnetic layer is preferable in view of more enhanced recording density.

The magnetic layer is preferably formed from an alloy predominantly comprised of cobalt.

A preferable example of the in-plane magnetic layer is a ferromagnetic CoCrPtTa layer formed on a non-magnetic CrMo underlayer.

A preferable example of the perpendicular magnetic layer comprises an alloy predominantly comprised of cobalt, which includes, for example, a 70Co-15Cr-15Pt alloy and a 70Co-5Cr-15Pt-10SiO$_2$ alloy (the numeral occurring immediately before each element refers to % by mole of the element). The magnetic layer preferably has a granular structure.

A preferable multilayer structure for the magnetic recording medium comprises a combination of a soft magnetic underlayer comprised of a FeCo alloy such as FeCoB, FeCoSiB, FeCoZr, FeCoZrB or FeCoZrBCu; a FeTa alloy such as FeTaN or FeTaC; or a Co alloy such as CoTaZr, CoZrNB or CoB; an orientation-control layer comprised of Pt, Pd, NiCr or NiFeCr; and optionally an intermediate ruthenium layer; and, formed thereon, the above-mentioned perpendicular ferromagnetic layer comprised of a cobalt alloy.

In the magnetic recording medium of the present invention, a magnetic layer having a granular structure is preferably used as the magnetic layer because a magnetic layer having a granular structure exhibits a high reactivity for magnetic properties-modification or demagnetization of the specific regions thereof. The term "magnetic layer having a granular structure" as used herein refers to a magnetic layer having a structure comprised of magnetic particles which are surrounded by an oxide. As specific examples of the oxide, there can be mentioned SiO$_2$ (as exemplified above as one ingredient of a ferromagnetic cobalt alloy), Ti oxides, W oxides, Cr oxides, Co oxides, Ta oxides and Ru oxides.

The magnetic layer usually has a thickness in the range of 3 nm to 20 nm, preferably 5 nm to 15 nm. The magnetic layer is formed so that sufficiently high input and output head powers can be obtained in consideration of the kind of magnetic alloy and the laminar structure. The magnetic layer should have a thickness of at least certain value so as to obtain an output power of at least certain level at reproduction. However, parameters relating to the recording/reproducing characteristics are generally deteriorated with an increase of the output power. Therefore an optimum thickness of magnetic layer is preferably chosen in consideration of the output power and the recordation-reproduction characteristics.

The magnetic layer is usually formed as a thin film by a sputtering method.

A mask layer is usually formed on the surface of the magnetic layer. The mask layer is preferably comprised of carbon. When the mask layer is comprised of carbon, dry etching of the mask layer using an oxygen gas, such as reactive ion etching or reactive ion milling, using an oxygen gas can be conducted with a high efficiency, and hence, the amount of the residual mask layer in the above-mentioned step (G) in FIG. 5 can be reduced and staining of a resulting magnetic recording medium can be minimized.

The formation of the carbon mask layer can be effected by, for example, a sputtering or CVD method. A CVD method is preferably adopted because a dense carbon film is formed.

The carbon mask layer preferably has a thickness in the range of 5 nm to 40 nm, more preferably 10 nm to 30 nm. With a thickness of thinner than 5 nm, undesirable sagging at the edge portion of the carbon layer tends to occur and the formability of a magnetic recording pattern is deteriorated. Further, ions tend to penetrate through the resist layer and the carbon mask layer into the magnetic layer, thereby deteriorating the magnetic properties of the magnetic layer. In contrast, with a thickness of thicker than 40 nm, the time required for etching the carbon mask layer becomes long and thus the productivity becomes poor. Further, when the carbon mask layer is etched, a residue undesirably remains on the magnetic layer.

Then a resist layer is formed on the carbon mask layer and then a negative pattern of the magnetic recording pattern is formed on the resist layer. The formation of a negative pattern of the magnetic recording pattern on the resist layer can be carried out usually by the conventional photolithographic technique. However, it is preferable from an operation efficiency to adopt a method of pressing a stamp against the resist layer whereby a negative pattern of a magnetic recording pattern is transferred to the resist layer.

In the production process, after a negative pattern of the magnetic recording pattern is formed on the resist layer 4 in step D shown in FIG. 5, the depressed regions 8 of resist layer 4 preferably have a thickness in the range of 0 to 20 nm. When the depressed regions 8 of resist layer have such thickness, the selective removal of the resist layer and the carbon layer in step E in FIG. 5 and step F in FIG. 6 can be effected in an advantageous manner. That is, undesirable sagging at edge portions of the carbon mask layer 3 can be avoided and the shieldability of the carbon mask layer 3 against milling ion 6 can be enhanced in step F in FIG. 6, and the formability of the magnetic recording pattern by the carbon mask layer 3 also is enhanced.

In a preferred embodiment of the production process, a material which can be cured upon irradiation with radiation is used as the material for forming the resist layer 4 in step C in FIG. 5; and, when a negative magnetic recording pattern is transferred onto the resist layer 4 by using a stamp 5 in step D, or after the transfer of negative magnetic recording pattern has been completed, the resist layer 4 is irradiated with radiation. In this preferred embodiment, the configuration of stamp 5 can be transferred on the resist layer 4 with high precision. Consequently, when the regions of the carbon mask layer 3, corresponding to the negative magnetic recording pattern of the magnetic recording pattern, are removed by etching in step E in FIG. 5, undesirable sagging at edge portions of the carbon mask layer 3 can be avoided and the shieldability of the carbon mask layer 3 against milling ion 6 can be enhanced, and the formability of the magnetic recording pattern by the carbon mask layer 3 can also be enhanced.

The radiation used for curing the curable material refers to electromagnetic waves in a broad sense which include heat rays, visible light, ultraviolet light, X rays and gamma rays. As specific examples of the curable material, there can be mentioned thermosetting resins which are curable by heat rays, and ultraviolet-setting resins which are curable by ultraviolet light.

In the production process, the step D of transferring a negative magnetic recording pattern onto the resist layer 4 by using a stamp 5 is preferably carried out in a manner such that the stamp 5 is pressed on the resist layer 4 having high fluidity, and, while the resist layer is in a pressed state, the resist layer 4 is irradiated with radiation to be thereby cured, and thereafter the stamp 5 is removed from the resist layer 4. By this procedure, the configuration of the stamp can be transferred to the resist layer 4 with a high precision.

For irradiating the resist layer having high fluidity with radiation while the resist layer is in a pressed state, there can be adopted a method of irradiating a laminate structure comprising the resist layer with radiation by exposing the substrate side (i.e., side opposite to the stamp-pressed resist layer) of the laminate structure to the radiation; a method of using a radiation-transmitting stamp, and exposing the stamp-pressed side of the laminated structure to radiation; a method of exposing the stamp-pressed resist layer to radiation by applying radiation from side of the laminate structure; and a method of exposing the stamp-pressed side of the laminate structure or the opposite side (substrate side) thereof, with radiation exhibiting a high conductivity to a solid, such as heat rays.

In a preferred specific example of the procedure of irradiating the radiation-curable resist layer with radiation to cure the resist layer, an ultraviolet ray-curable resin such as novolak resin, an acrylic acid ester resin or a cycloaliphatic epoxy resin is used as the radiation-curable resist resin, and a stamp made of a highly ultraviolet ray-transmitting glass or resin is used.

In the production process, a $SiO_2$ material or $SiO_2$-containing material is preferably used for the resist layer. A $SiO_2$ material or $SiO_2$-containing material exhibits a high resistance to dry-etching using an oxygen gas, and therefore, when a negative pattern of a magnetic recording pattern is formed on the carbon mask layer by ion milling, undesirable blurring of a negative pattern image can be avoided. In other words, the carbon mask layer can be subjected to dry etching using an oxygen gas without difficulty and with high efficiency. Since the $SiO_2$ material or $SiO_2$-containing material exhibits a high resistance to dry-etching using an oxygen gas, when a negative pattern of a magnetic recording pattern is formed on the carbon mask layer by dry etching, a sharp image of the negative pattern with sheer side walls in the edges of the negative pattern image of the carbon mask layer can be formed. Thus a sharp magnetic recording pattern is given to the magnetic layer, and a magnetic recording medium having improved fringe characteristics can be obtained.

After the negative pattern of the magnetic recording pattern is given to the resist layer 4 in step D shown in FIG. 5 in the case when the depressed regions 8 of resist layer 4 remains, the depressed regions of resist layer are removed and further the corresponding regions of the carbon mask layer are removed in step E. The removal of the depressed regions of resist layer and the corresponding regions of carbon mask layer are effected by dry etching such as reactive ion etching or reactive ion milling.

In the production process, regions of the magnetic layer, which are not covered with the carbon mask layer and the resist layer, are magnetically modified or demagnetized (not illustrated in FIG. 6); and preferably, prior to the magnetic properties-modification or demagnetization, surface layer portions in said regions of the magnetic layer are removed to a depth in the range of 0.1 nm to 15 nm (the depth is indicated by "d" in step F in FIG. 6). This is because surface layer portions in the exposed regions of the magnetic layer have been often modified by the influence of the carbon mask layer or air, and the modified surface layer portions tend to interfere the reaction for magnetic properties-modification or demagnetization of the magnetic layer.

The removal of the surface layer portions of the magnetic layer is effected by, for example, dry-etching (more specifically, ion-milling or reactive ion etching) the surface layer portions of the carbon mask layer, and thereafter, dry-etching the thus-exposed surface layer portions of the magnetic layer. By adopting the above-mentioned procedures, a sharp image of the negative pattern with sheer side walls in the edges of the negative pattern image of the carbon mask layer can be formed. This leads to the formation of a sharp pattern with sheer side walls in the edges of the magnetic layer. These procedures result in a magnetic recording medium having improved fringe characteristics.

In the production process, the above-mentioned removal of the residual carbon layer is preferably carried out by a reactive ion etching method using an oxygen gas. The above-mentioned removal of the surface layer portions of the magnetic layer is preferably carried out by dry etching, for example, ion milling while an inert gas such as argon gas or $N_2$ gas is introduced. Thus the ion milling of the carbon mask layer and the ion milling of the surface layer portions of the magnetic layer should preferably be carried out by an optimum procedure and under optimum conditions.

The regions of the magnetic layer, from which the surface layer portions corresponding to the negative pattern have been removed, are subjected to a treatment for modifying the magnetic properties or demagnetizing in said regions of magnetic layer. More specifically, said regions of magnetic layer are treated, for example, by exposing to oxygen or ozone 10, or irradiating with a laser, or exposing to a reactive plasma or a reactive ion thereby modifying the magnetic properties of said regions or magnetic layer or demagnetizing said regions of magnetic layer.

In a preferred embodiment of the production process, prior to magnetic properties-modification or demagnetization of the exposed regions of the magnetic layer, which are not covered with the carbon mask layer and the resist layer, said exposed regions of the magnetic layer are exposed to a fluorine-containing gas. By the exposure to a fluorine-containing gas, the reactivity of the exposed regions of the magnetic layer for the magnetic properties-modification or demagnetization is more enhanced, and the magnetic properties-modification or demagnetization can be conducted with more enhanced efficiency.

The magnetic layer formed in the magnetic recording medium of the present invention preferably has a granular structure as mentioned above. By the term "granular structure" as used herein, we mean a structure comprised of magnetic particles which are surrounded by an oxide. In the magnetic layer having a granular structure, magnetic crystal particles are separated by non-magnetic phases, and hence, magnetic interaction among the particles is weak and the resulting magnetic layer is characterized as exhibiting a very low noise. When the magnetic layer having a granular structure is exposed to oxygen or ozone for magnetic properties-modification or demagnetization, oxide layers surrounding magnetic particles at grain boundaries are easily selectively etched by, for example, a reactive ion etching apparatus using a fluorine-containing gas, and consequently the oxidation reaction of a magnetic metal such as cobalt in the magnetic layer with oxygen or ozone can be accelerated and the modification of the magnetic properties or demagnetization in the regions partitioning a magnetic recording pattern can be effected with a more enhanced efficiency.

In the present invention, the magnetic layer can have a two-layer structure comprising a granular structure comprised of magnetic particles each surrounded by an oxide, and a non-granular structure formed on the granular structure.

To produce a magnetic recording medium exhibiting a more enhanced recording density, a magnetic layer having a magnetic pattern comprised of magnetic portions with a width "W" and non-magnetic portions with a width "L", as illustrated in FIG. 4, is formed preferably so that W and L are not larger than 200 nm and not larger than 100 nm, respectively, and thus, the track pitch (i.e., the sum of W plus L) is preferably not larger than 300 nm. The smaller the track pitch, the higher the recording density.

The magnetically partitioned magnetic recording pattern in the magnetic recording medium of the present invention can include a pattern of a type wherein an upper part of each magnetic region is partitioned by the adjacent non-magnetic regions or magnetic properties-modified regions, but, a lower part of each magnetic region is not partitioned by the adjacent non-magnetic regions, i.e., a lower part of the magnetic region is contiguous to the adjacent lower parts of the magnetic portions. This partially partitioned magnetic recording pattern should be construed to be included in the magnetically partitioned magnetic recording pattern in the magnetic recording medium of the present invention.

By the term "magnetic recording patterns" as used in this specification is meant a magnetic recording pattern in a broad sense which include patterned media of a bit pattern type wherein magnetic recording patterns are arranged with a certain regularity per bit; discrete type media wherein magnetic recording patterns are arranged in tracks fashion; and servo signal patterns and burst signal patterns.

The magnetic recording medium of the present invention is preferably a discrete type magnetic recoding medium in view of simplicity and ease in the production, wherein the magnetically partitioned magnetic recording patterns involve magnetic recoding tracks and servo signal patterns.

In the process for producing the magnetic recording medium of the present invention, after the step F of modifying the magnetic properties of the specific regions of magnetic layer, or demagnetizing said regions of magnetic layer, the step G of removing the residual mask layer and residual resist layer is carried out. The removal of the residual resist layer and the residual mask layer is carried out preferably by dry etching, reactive ion etching or ion milling.

In a preferred embodiment of the production process, after the step G, the surface of magnetic layer is preferably exposed to an inert gas such as argon gas in step H as illustrated in FIG. 6 whereby the outermost surface portion of the magnetic layer, which have been exposed to, for example, ozone, is etched so that a surface layer portion with a thickness of 1 to 2 nm is removed. Thus the surface of magnetic layer in the magnetic properties-modified or demagnetized regions is rendered smooth.

The uppermost surface of the magnetic layer, from which the residual resist layer and the residual carbon mask layer have been removed, and which includes the magnetic regions and the depressions which have been filled or have not been filled with a non-magnetic material, is usually coated with a protective overcoat 9 as illustrated in step I in FIG. 6.

The overcoat 9 can be formed from a material conventionally used for the general overcoats, which includes, for example, carbonaceous materials such as carbon (C), hydrogenated carbon ($H_xC$), nitrided carbon (CN), amorphous carbon and silicon carbide (SiC); and other conventionally used materials such as $SiO_2$, $Zr_2O_3$ and TiN. Two or more overcoats may be formed.

The thickness of the overcoat 9 is preferably not larger than 10 nm. If the thickness of the protective overcoat is larger than 10 nm, the distance between the head and the magnetic layer becomes undesirably large and the input and output powers are often insufficient.

The formation of the protective overcoat is usually carried out by a sputter method or a CVD method.

A lubricating layer (not shown in FIG. 6) is preferably formed on the protective overcoat. The lubricating layer is formed from, for example, a fluorine-containing lubricant, a hydrocarbon lubricant or a mixture thereof. The thickness of the lubricating layer is usually in the range of 1 to 4 nm.

The constitution of an example of the magnetic recording-reproducing apparatus according to the present invention is illustrated in FIG. 7. The magnetic recording-reproducing apparatus of the present invention comprises, in combination, the above-mentioned magnetic recording medium 30 of the present invention; a driving part 34 for driving the magnetic recording medium in the recording direction; a magnetic head 31 comprising a recording part and a reproducing part; head-driving part 33 for moving the magnetic head 31 in a relative motion to the magnetic recording medium 30; and a recording-and-reproducing signal treating means 32 for inputting signal into the magnetic head 31 and for reproduction of output signal from the magnetic head 31.

The magnetic recording-reproducing apparatus comprising the combination of the above-mentioned means can provide a high recording density. More specifically, in the magnetic recording medium of the magnetic recording-reproducing apparatus, the magnetic recording tracks are magnetically discrete, and therefore, the recording head width and the reproducing head width can be approximately the same size as each other with the result of sufficiently high reproducing output power and high SNR. This is in a striking contrast to the conventional magnetic recording medium wherein the reproducing head width must be smaller than the recording head width to minimize the influence of the magnetization transition regions in the track edges.

By constituting the reproducing part of the magnetic head as GMR head or TMR head, a sufficiently high signal intensity can be obtained even at a high recording density, that is, the magnetic recording apparatus having a high recording density can be provided.

When the head is floated at a floating height in the range of 0.005 μm to 0.020 μm, which is lower than the conventionally adopted floating height, the output power is increased and the SNR becomes large, and thus the magnetic recording apparatus can have a large size and a high reliability.

If a signal treating circuit using a sum-product composite algorithm is combined in the magnetic recording medium, the recording density can be much more enhanced, and a sufficiently high SNR can be obtained even when recordation-reproduction is carried out at a track density of 100 k-tracks or more per inch, or a linear recording density of 1,000 k-bit or more per inch, or a high recording density of at least 100 G-bit or more per square inch.

EXAMPLES

Examples 1 to 11, and Comparative Examples 1 to 6

A glass substrate for HD was placed in a vacuum chamber and the chamber was vacuumed to a pressure of not higher than $1.0 \times 10^{-5}$ Pa to remove the air. The glass substrate used was comprised of glass ceramics having a composition of $Li_2Si_2O_5$, $Al_2O_3$—$K_2O$, MgO—$P_2O_5$ and $Sb_2O_3$—ZuO, and has an outer diameter of 65 mm and an inner diameter of 20 mm, and an average surface roughness (Ra) of 2 angstroms.

On the glass substrate, a soft magnetic underlayer composed of 60Fe-30Co-10B, an intermediate layer composed of Ru and a magnetic layer having a granular structure comprised of a 70Co-5Cr-15Pt-10 ($SiO_2$) alloy (the numerals immediately before the elements indicate percents by mole of the elements) were formed in this order by a DC sputtering method (FIG. 5, step A). Then a carbon mask layer was formed on the magnetic layer by a P-CVD method (FIG. 5, step B). The thickness of these layers were as follows. soft magnetic 60Fe-30Co-10B layer: 60 nm, intermediate Ru layer: 10 nm, magnetic layer: 15 nm, and carbon mask layer: 30 nm. A $SiO_2$ resist was formed on the carbon mask layer by a spin-coating method (FIG. 5, step C). The $SiO_2$ resist had a thickness of 100 nm.

A glass stamp having a negative pattern corresponding to the desired magnetic recording pattern was pressed onto the resist layer at a pressure of 1 MPa (about 8.8 kgf/cm²) (FIG. 5, step D). Thereafter the stamp was separated from the resist layer thereby transferring a magnetic recording pattern onto the resist layer. The thus-transferred magnetic recording pattern had a configuration such that the elevations in the data area in the resist layer were circular with a width of 120 nm, and the depressions in the data area in the resist layer were circular with a varied width. The areal ratio of the depressions in the data area was varied in the range of 5% to 80%. A servo information area with a width of 20 μm was formed between the data areas. The magnetic pattern in the servo information area had a configuration such that the elevations had a width of 120 nm, and the areal ratio of the depressions was varied in the range of 10% to 50% by changing the shape of the pattern.

The areal ratio of the depressions in the servo information area, the areal ratio of the depressions in the data area, and difference between the two areal ratios, obtained in the Examples and the Comparative Examples, are shown in Table 1. The thickness of the patterned resist layer was 80 nm and the thickness of the depression portions of the resist layer was about 5 nm. The depression portions had an angle of about 90 degrees to the substrate surface.

The depression portions of the resist layer and the corresponding portions of the carbon mask layer were removed by dry etching (FIG. 5, step E). The dry etching for the resist layer was carried out under the following conditions. $CF_4$ gas flow rate: 40 sccm, pressure: 0.5 Pa, plasma power: 200 W, bias voltage: 20 W, and etching time: 10 seconds. The dry etching for the carbon mask layer was carried out under the following conditions. $O_2$ gas flow rate: 40 sccm, pressure: 0.3 Pa, high frequency plasma power: 300 W, DC bias voltage: 30 W, and etching time: 30 seconds.

The surface layer portions in the depressions of the magnetic layer were removed by ion etching (FIG. 6, step F). The ion etching was carried out under the following conditions. $N_2$ gas flow rate: 10 sccm, pressure: 0.1 Pa, acceleration voltage: 300 V, and etching time: 5 seconds. The depth "d" (FIG. 6, step F) in the region from which surface layer portion of magnetic layer has been partially removed, i.e., thickness of removed surface layer portion of magnetic layer, was about 1 nm.

Thereafter the exposed regions of the magnetic layer, which are not covered with the carbon mask layer 3, were exposed to ozone gas while ozone gas was flown in a chamber under the following conditions. Flow rate of ozone gas: 40 sccm, pressure: 1 Pa, exposure time: 10 seconds, and substrate temperature: 150° C.

The residual carbon mask layer and the residual resist layer were removed from the laminate for a magnetic recording medium by dry etching (FIG. 6, step G). Then a surface layer portion (thickness: about 1 to 2 nm) of the magnetic layer was removed by dry etching using an ion milling apparatus at a flow rate of argon of 10 sccm, a pressure of 0.5 Pa for a treating time of 5 seconds (FIG. 6, step H). Then a carbon protective overcoat with a thickness of 5 nm was formed on the magnetic layer (FIG. 6, step I), and finally a fluorine-containing lubricant film coating with a thickness of 2 nm was formed thereby completing the production of a magnetic recording medium.

The thus-produced magnetic recording medium was rotated at a high speed to evaluate the floating characteristics of a head slider having a width of 300 μm and a length of 500 μm. The evaluation of the floating characteristics was conducted by measuring the largest limit of floating height (nm) at which the head slider is contacted with the magnetic recording medium. The results are shown in Table 1. The smaller the largest limit of floating height, the more satisfactory the floating characteristics of the magnetic recording medium.

TABLE 1

| Examples | Areal ratio of depressions (%) | | | Largest floating height (nm) |
|---|---|---|---|---|
| | In servo area | In data area | Difference | |
| Example 1 | 50 | 60 | −10 | 7 |
| Example 2 | 50 | 55 | −5 | 6 |
| Example 3 | 50 | 50 | 0 | 5.1 |
| Example 4 | 50 | 45 | 5 | 6.2 |
| Example 5 | 50 | 40 | 10 | 7.1 |
| Example 6 | 30 | 40 | −10 | 6.2 |
| Example 7 | 30 | 30 | 0 | 4.7 |
| Example 8 | 30 | 20 | 10 | 6.4 |
| Example 9 | 10 | 17.5 | −7.5 | 6.3 |
| Example 10 | 10 | 10 | 0 | 4.8 |
| Example 11 | 10 | 5 | 5 | 5.7 |
| Com. Ex. 1 | 50 | 80 | −30 | 11.4 |
| Com. Ex. 2 | 50 | 70 | −20 | 9.7 |
| Com. Ex. 3 | 50 | 30 | 20 | 9.8 |
| Com. Ex. 4 | 50 | 20 | 30 | 10.3 |
| Com. Ex. 5 | 30 | 50 | −20 | 9.5 |
| Com. Ex. 6 | 30 | 10 | 20 | 9.9 |

As seen from the data given in Table 1, when the absolute value for the difference between the areal ratio (%) of depressions in the servo information areas and the areal ratio (%) of depressions in the data areas is not larger than 10(%), the largest floating height of the head slider can be reduced to an important extent.

INDUSTRIAL APPLICABILITY

According to the magnetic recording medium of the present invention which has a magnetic pattern with elevations and depressions on a magnetic layer, stable head-floating characteristics can be attained. Thus, the largest floating height can be reduced to great extent, and the magnetic recording medium exhibits a high recording density.

The invention claimed is:

1. A magnetic recording medium having a magnetic pattern magnetically partitioning a magnetic layer, formed on at least one surface of a non-magnetic substrate, characterized in that the magnetic pattern is comprised of magnetic regions and non-magnetic regions surrounding each of the magnetic regions, wherein the non-magnetic regions form depressions relative to the magnetic pattern, the magnetic pattern comprises data areas and servo information areas, and an absolute value of the difference between the areal ratio of the depressions in the data areas and the areal ratio of the depressions in the servo information areas is not larger than 10%.

2. The magnetic recording medium according to claim 1, wherein the areal ratio of the depressions in the data areas is in the range of 10% to 50%.

3. The magnetic recording medium according to claim 1, wherein the data areas form elevations constituting tracks in the data areas.

4. The magnetic recording medium according to claim 1, wherein the depressions in the data areas and the depressions in the servo information areas have a depth in the range of 0.1 nm to 15 nm.

5. The magnetic recording medium according to claim 1, wherein the magnetic regions comprise a magnetic layer having a granular structure comprised of magnetic grains each surrounded by an oxide.

6. The magnetic recording medium according to claim 1, wherein the magnetic regions comprise a magnetic layer having a two-layer structure composed of a granular structure comprised of magnetic grains each surrounded by an oxide, and a non-granular structure, formed on the granular structure.

7. A magnetic recording/reproducing apparatus characterized by comprising, in combination, the magnetic recording medium as claimed in claim 1; a driving part for driving the magnetic recording medium in the recording direction; a magnetic head comprising a recording part and a reproducing part; means for moving the magnetic head in a relative motion to the magnetic recording medium; and a recording-and-reproducing signal treating means for inputting signal to the magnetic head and for reproducing output signal from the magnetic head.

* * * * *